May 28, 1929.   S. P. CROSWELL   1,714,902
BABY CARRIAGE
Filed April 22, 1927
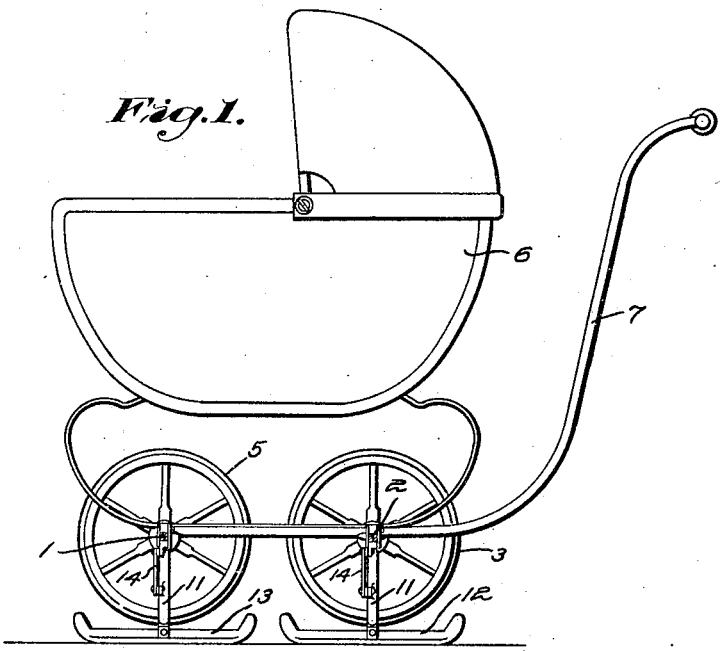
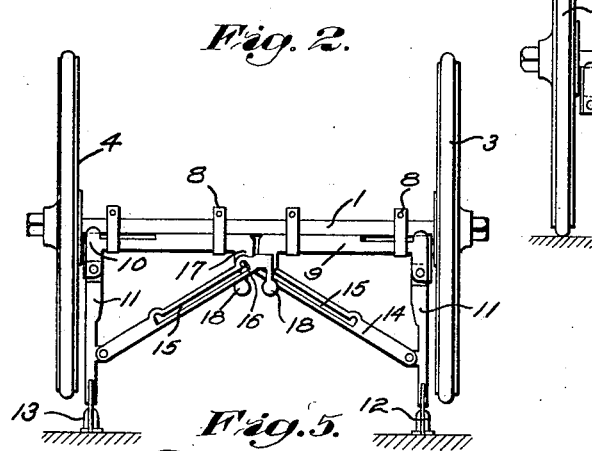
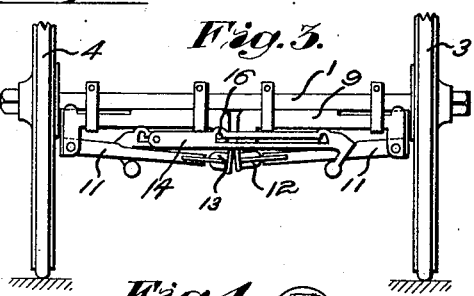
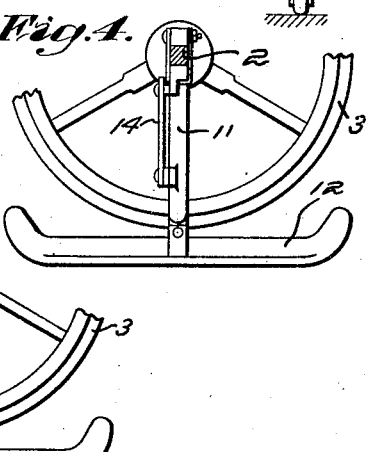
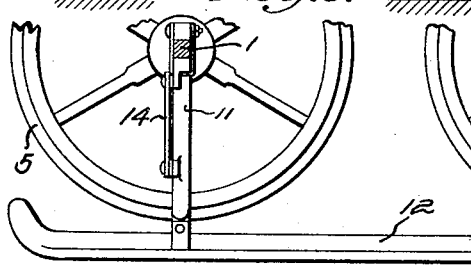
Inventor:
Samuel P. Croswell, Patented May 28, 1929.

1,714,902

UNITED STATES PATENT OFFICE.

SAMUEL P. CROSWELL, OF MALDEN, MASSACHUSETTS.

BABY CARRIAGE.

Application filed April 22, 1927. Serial No. 185,815.

This invention relates to baby carriages and particularly to the chassis or running gear thereof, and aims to provide a novel construction embodying both wheels and runners conveniently adapted for use as and when desired.

In the drawing of one embodiment of my invention selected for illustration and description, Fig. 1 is a side elevation, the wheels on the near side being removed, and showing the runners in operative position;

Fig. 2, an enlarged rear end elevation of the chassis with the body removed, and the runners in operative position;

Fig. 3, a similar figure partly broken away with the runners in inoperative position;

Fig. 4, a cross-sectional detail partly broken out on the line 4—4, Fig. 2; and

Fig. 5, a longitudinal cross-section similar to Fig. 1, without the body, partly broken out, showing a modified form of construction.

Referring first to Figs. 1 to 4, my novel construction comprises the usual front axle 1, and rear axle 2, suitably connected by members not shown, the rear axle provided with wheels 3, 4, and front axle similarly provided with wheels, only one of which, 5, is shown, Fig. 1. The chassis is, of course, provided with the usual body 6 of desired type, and handle 7.

Beneath each axle 1, 2, Figs. 1–4, and conveniently secured to it as by clips 8, are one or more, preferably as herein shown two, runner bolsters 9, provided at their outer ends with depending carriers or posts 10. Each post is preferably depressed at its upper end to receive the axle 1, thereby to reinforce the locking engagement of the carrier 9 and axle 1, and each post carries at its lower end and pivoted thereto, a runner support 11 pivotally supported also at its lower end to the runner 12 or 13.

The support 11, Fig. 2, has pivoted to it on its inner face one end of a link 14, the opposite end of which is slidably engaged with the bolster 9 by means of a slot 15 in the link 14, which slot engages a pin 16 on a boss 17 on the member 9, the pin resting in the short laterally directed end of the slot, which thus holds the link 14 in position. The inner end of each link 14 carries a small boss or ball 18 which, by adding weight to the link, assists it in maintaining its engagement with the pin 16. A similar laterally extended slot end near the opposite end of the slot 15, Fig. 3, acts to engage the same pin when the link and support 11 are in raised position, the weight 18 performing its usual function in each case.

The respective links 14 engage pins 16 on opposite sides of each axle so that they do not interfere with each other. The runners and supports are normally carried in the position shown in Fig. 3, when the wheels are to be used.

When it is desired to dispense with the wheels, whether before starting out with the carriage or subsequently, and to use the runners, the rear end of the carriage is raised slightly from the ground, the links 14 on the rear axle disengaged from the pins 16 by hand, or the balls 18 gently raised by the foot, releasing the pins from their engagement with the links 14, and the runners may then be swung down into operative position. The same proceeding is followed at the front axle and the front runners similarly positioned, or, if preferred, those on the front axle may be adjusted first.

When it is desired to change from runners to wheels, the procedure is reversed. First one front or rear link is slightly raised at its upper end by the hand or foot, the support 11 is turned upward about its pivot and locked as already described, and then the opposite link is similarly disposed of. After this the runners on the other axle are likewise positioned.

In Fig. 5 there is shown a modified construction wherein one long runner 12 is used on each side instead of two runners, mounted and operated on members 11 in the same way, however. The use of one runner on each side instead of two gives a little more stability to the body 6.

By the use of my novel construction above described, one may use either runners or wheels at any time at a moment's notice with little difficulty, to accommodate himself to changed conditions. Furthermore, after using the runners, if one wishes to take the carriage up a flight of steps, he can readily change from runners to wheels for the greater convenience of ascending the steps, and the same procedure may be followed in leaving the house.

The necessity for removing the wheels when they are not needed is avoided and the convenience of being able to use either wheels or runners as needed at a moment's notice is obtained.

My invention is not limited to the embodiment thereof described and illustrated herein, and I claim:

1. A baby carriage chassis comprising an axle, wheels thereon, a runner bolster on the axle, a vertically swinging runner carrier with a runner thereon pivoted on its longitudinal axis to the bolster, a longitudinally slotted link having laterally extended slots therein and weighted ends connecting the carrier and bolster; and locking members on the bolster to engage the lateral slots in the links to hold them with the runners in selected position.

2. A baby carriage chassis comprising a plurality of axles, wheels thereon, a runner bolster on each axle, vertically swinging runner carriers with runners thereon pivoted on their longitudinal axes to the bolsters, a longitudinally slotted link having also lateral slots therein and weighted ends connecting the carriers and bolsters; and locking members on the bolsters to engage the lateral slots in the links to hold the links and runners in operative and inoperative positions.

In testimony whereof, I have signed my name to this specification.

SAMUEL P. CROSWELL.